April 11, 1961 R. D. REEDER ET AL 2,979,229
OBJECT DISPENSER HAVING RECEIVER-ACTUATED OBJECT RELEASE MEANS
Filed Feb. 24, 1958
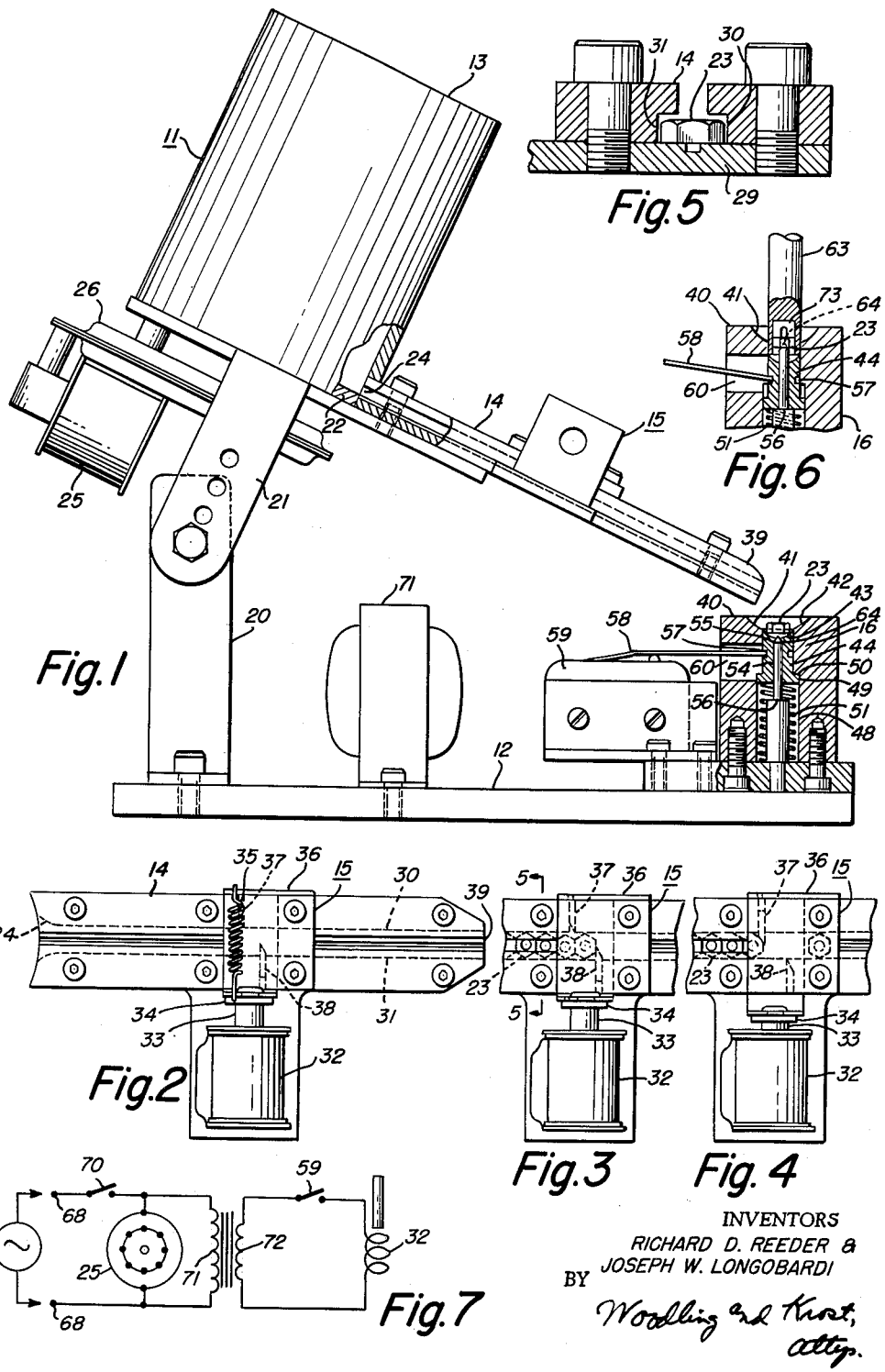
INVENTORS
RICHARD D. REEDER &
JOSEPH W. LONGOBARDI
BY
Woodling and Krost,
atty.

United States Patent Office 2,979,229
Patented Apr. 11, 1961

2,979,229

OBJECT DISPENSER HAVING RECEIVER-ACTUATED OBJECT RELEASE MEANS

Richard D. Reeder, Alliance, and Joseph W. Longobardi, Beloit, Ohio, assignors to The Alliance Manufacturing Company, Division of Consolidated Electronics Industries Corporation, a corporation of Delaware Filed Feb. 24, 1958, Ser. No. 717,043

14 Claims. (Cl. 221—22)

The invention relates in general to dispensers for objects such as small objects and more particularly relates to the dispensing one at a time of a small object into a position whereat the object may be picked up by a tool and another object automatically dispensed. Dispensers for objects and small objects have been known before, but in general they are large and cumbersome relative to the size of the object and subject to jamming or malfunctioning from various causes. A simple reliable dispenser for automatically dispensing one object at a time has not been located on the market.

Accordingly, an object of the invention is to provide an automatic dispenser for dispensing small objects one at a time to a pick-up station.

Another object of the invention is to provide a dispenser which dispenses small objects into a pick-up depression and, when the object is picked up, automatically another object is dispensed into the depression.

Another object of the invention is to provide an electromechanical dispenser for automatically dispensing objects as fast as they are required and in direct accordance with the requirements.

Still another object of the invention is to provide an automatic dispenser for objects which may be picked up by a tool such as a socket or chuck from a depression and, upon movement of the tool into the depression, a linkage is actuated to cause another object to be dispensed into the depression ready for the next pick up by the tool.

Another object of the invention is to provide a dispenser which automatically centers and rights an object into the proper attitude for being picked up.

Another object of the invention is to provide an automatic dispenser for apertured objects from a pick-up depression wherein the objects are limited in movement by a central stud engaging the aperture to cause the object to enter the socket of a tool moving into the depression.

Other objects and a fuller understanding of this invention may be had by referring to the following description and claims, taken in conjunction with the accompanying drawing, in which:

Figure 1 is a side elevational view partially in section of a dispenser embodying the invention;

Figure 2 is a generally downward view on the dispenser chute portion of Figure 1;

Figures 3 and 4 are partial views of the chute of Figure 2 showing the gate in two different positions;

Figure 5 is a sectional view on the line 5—5 of Figure 3;

Figure 6 is a partial view of the pick-up stand of Figure 1 with a tool entering the depression; and Figure 7 is a schematic circuit diagram.

The various figures of the drawing illustrate a preferred embodiment of a dispenser 11 which includes generally a base 12, a supply container 13, a chute 14, a gate 15, and a pick-up stand 16. The dispenser 11 may be used for dispensing many objects whether large or small and has been shown as constructed to dispense small objects, in this case small apertured objects such as hexagonal nuts. Small objects such as No. 6–32 nuts are only about one-quarter of an inch across the flats and hence are quite difficult to manipulate with ease and rapidity. The dispenser 11 accomplishes, in small size compared with the prior art, a dispenser for automatically dispensing such objects automatically and as needed.

The base 12 includes a pedestal 20 on which is carried an inverted U-shaped bracket 21 which may be adjusted in height and angularity. The supply container 13 is carried on the upper end of the bracket 21 and has a floor 22 generally co-planar with the floor of the chute 14 to deliver objects such as nuts 23 to an exit 24. The supply container may be of any satisfactory form for supplying substantially continuously objects to the exit 24 and hence to the chute 14, and may be the type of dispenser container disclosed and claimed in the copending application Serial No. 716,978, filed February 24, 1958, entitled "Dispenser Container." The supply container 13 may contain a motor 25 and gear reduction unit 26 to drive an agitator, stirrer, or vibrator means to aid the supply container 13 in its function of supplying objects to the chute 14.

Figure 5 shows a cross-section of the chute with a nut 23 therein and best shows that the chute includes a bottom wall 29 and side walls 30 and 31 to guide the nuts or objects 23. Mounted on the chute 14 is the gate 15 and a gate power means, in this case shown as a gate solenoid 32. The solenoid 32 has a movable plunger 33. A shoulder 34 on the plunger 33 is connected by a spring 35 to an upstanding fixed flange 36 on the chute, and this spring 35 urges the plunger 33 outwardly of the solenoid. The gate 15 includes upper and lower gate knives 37 and 38. These gate knives 37 and 38 are mounted to be movable with the plunger 33. As shown in the difference between Figures 3 and 4, when the solenoid is de-energized as in Figure 3, the lower knife 38 holds back the continuous supply of objects 23 and, when the solenoid is energized as in Figure 4, both knives are moved toward the solenoid so that the lower knife permits an object to slide down the chute 14 to the delivery end 39 and the upper knife 37 holds back the supply of objects.

The pick-up stand 16 has an upper surface 40 containing a pick-up depresson 41. This pick-up depression 41 is formed partially from a concavity 42 in the pick-up stand 16 itself and partly from a depression 43 in the upper end of a plunger 44. These depressions 41 and 43 are preferably partially spherical to be most efficient in righting and centering the objects 23.

A central bore 48 is provided in the pick-up stand 16 to receive the plunger 44, and the plunger has a shoulder 49 engageable with a shoulder 50 in the bore 48 under urging of a spring 51. A central aperture 54 is provided in the plunger 44 to receive a central fixed stud 55. The stud 55 has a shoulder 56 against which the plunger 44 may bottom upon downward movement. A peripheral groove 57 is provided in the exterior surface of the plunger 44 to receive the actuating finger 58 of a switch 59. This switch may be of the type requiring only small movement and small pressure for actuation and may be of the snap acting variety. Several such switches are commercially available. The finger 58 extends through an opening 60 in the side of the stand 16.

Figure 6 shows the pick-up stand 16 in its actuated condition wherein a tool 63, such as a chuck or socket, has entered the pick-up depression 41 to pick up one of the nuts 23. Such movement of the tool 63 into the depression 41 moves the plunger 44 downwardly until it bottoms on the shoulder 56. During this downward movement of the plunger 44, the switch 59 is actuated by downward movement of the finger 58. Also, since the stud 55 is fixed, the downward movement of the tool 63 pushes the nut 23 down slightly until the pointed end 64 enters the central aperture in the nut 23 and engages the periphery of this threaded aperture. Further downward movement of the tool 63 permits the tool to move down onto the nut 23 because it is held upwardly by the stud 55.

The pointed end 64 of the stud 55 is preferably disposed just slightly below the plane of the lowermost surface of the nut 23 as the nut lies in the depression 43, as shown in Figure 1. The diameter of the stud 55, however, is sufficiently large to prevent the entire stud entering the threaded aperture of the nut and hence, as the plunger 44 is moved downwardly, the nut will center upon and be helped to be righted into a horizontal plane by the conical or rounded point 64 engaging the periphery of the threaded aperture. Preferably, when the tool 63 is not in the depression 41, the spring 51 urges the plunger 44 upward to a point whereat the upper end of the plunger 44, namely, the periphery of the depression 43, is substantially flush with the interior periphery of the concavity 42.

Figure 7 shows schematically a circuit diagram which may be used with this dispenser 11 and energization terminals 68 may be supplied with electrical energy from any suitable source, in this case shown as an alternating current source 69. A master switch 70 may be closed to supply energization to the motor 25 and to a transformer 71 which may conveniently be mounted on the base 12. The transformer 71 may have a low voltage secondary 72 for safety considerations and is connected to the gate solenoid 32 through the switch 59. Each time the switch 59 is actuated the solenoid 32 will be energized to move the gate to release another object 23.

*Operation*

The entire dispenser 11 automatically dispenses objects, such as nuts 23, as desired. The dispenser 11 may be used in high quantity and rapid usage requirements such as assembly lines. On such assembly lines a power operated driver is frequently used to drive the tool 63. Such driver may be electrically or pneumatically operated to rotate the tool 63 which may take the form of a chuck or socket to receive the nut 23 and drive it onto a threaded bolt in the assembly line operations. Such tool 63 may contain a magnet 73 to aid in retaining the nut 23 within the tool after the tool 63 has been withdrawn from the depression 41. If a nut 23 is not already in the depression 41, the switch 59 may be actuated by hand to initially dispense a nut from the delivery end 39 of the chute into the depression 41. The fact that both depressions 41 and 42 are generally spherical aids in centering the nut as well as causing it to lie substantially horizontally. The tool 63 is generally rotating as it is brought down into the depression 41, or at least is caused to rotate at about the time it engages the nut 23. This rotation assures that the hexagonal socket mates with the hexagonal form of the nut 23. Continued downward movement of the tool 63 by the operator causes the plunger 44 to move downwardly whereupon the pointed end of the stud 54 enters and centers the threaded aperture of the nut to both aid in establishing the nut horizontal and to hold it upwardly so that the nut enters the socket of the tool 63 as the tool moves downwardly. The switch 59 is described as being actuated during the downward movement of the plunger 44, and this is caused to energize the solenoid 32 to dispense another nut. The solenoid may be continuously energized to the position shown at Figure 4 with switch 59 being a normally closed switch; and then, upon actuation of the switch 59, it will move to an open condition which will de-energize the solenoid 32 to the position shown in Figure 3 and then will be subsequently re-energized by upward movement of the plunger 44 to dispense another nut 23. Thus, it will be seen that either the upward or downward movement of the plunger 44 can be made to be that which actuates the gate solenoid.

In actual use it has been found that the movement of the tool into and out of the pick-up depression is extremely rapid in the order of one-half second; and hence, the tool 63 is out of the way before another nut slides down the chute into the depression 41. If, however, the tool 63 happens to be in the way for some reason, the nut is stopped at the delivery end 39 because this end is so close to the tool. Then, when the tool 63 is withdrawn, the nut will fall into the depression 43. The fact that the delivery end 39 of the chute 14 is just adjacent the vertically downward path of the tool in its movement to engage the plunger 44 has been found to aid the operator in quickly picking a nut out of the depression. This is because the operator may merely move the tool laterally until it engages the end of the chute, at which point the operator knows the tool and the plunger are vertically aligned, and then the tool may be moved directly downwardly.

Since the stud 55 is fixed, this provides that it limits the movement of the nut downwardly and thus, as the tool and the stud 55 relatively approach, the stud engages the nut to effect relative approach of the nut and the tool. Once the nut is within the socket of the tool 63 the magnet 73 is utilized to retain the nut therein. The switch 59, plunger 44, and gate solenoid 32 are linkage means interconnecting the pick-up stand 16 and the gate 15 to actuate this gate upon movement of the tool 63 into the pick-up depression 41.

Should an operator for some reason desire a nut 23 in his hand rather than in the tool 63, such a nut may be picked out of the pick-up depression 41. The natural movement of the operator's finger on the nut would be a type of a wiping action and the downward force incident to the removing of a nut from this depression 41 can actuate the plunger 44 downwardly to actuate the switch 59 and thus dispense another nut into the depression 41. The depression 43 is of a diameter larger than the diameter of the nut 23 so as to adequately receive this nut and to center it. The plunger 44 preferably has an outer diameter just slightly greater than the outer diameter of the socket of the tool 63 and hence will be slightly greater than the maximum dimension across the points of the hexagonal nut 23.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A dispenser for dispensing objects to be received by a tool, comprising, a pick-up stand, a central stud in said stand, apertured plunger means surrounding said stud and movable in said stand relative to said stud, a depression in the upper end of said stand to receive and center said objects, said stud capable of limiting vertical movements of said objects, gate means to permit only a single object at a time to exit into said depression, supply means to supply objects to said gate means, gate power means to actuate said gate means, and means interconnecting said pick-up stand and said gate power means to actuate said gate means upon movement of a tool into said depression to vertically move said plunger means to receive an object.

2. A dispenser for dispensing objects to be received by a tool, comprising, a pick-up stand, a central stud in said stand, apertured plunger means surrounding said stud and movable in said stand relative to said stud, a depression in the upper end of said stand to receive and center said objects, switch means actuated between open and closed conditions by a tool moving into said depression, said stud capable of limiting vertical movements of said objects, gate means to permit only a single object at a time to exit into said depression, supply means to supply objects to said gate means, gate power means to actuate said gate means, energization terminals, circuit means connecting said switch means and said energization terminals to said gate power means, whereby an object may be picked out of said depression by a tool and the relative approach of said tool and said central stud causing said limiting vertical movement action of said stud to become effective to cause relative approach of said object and said tool.

3. A dispenser for dispensing objects to be received by a downwardly moving tool, comprising, a pick-up stand, a central stud in said stand, a depression in the upper end of said stand to receive and center said objects, switch means actuated between open and closed conditions by a tool moving downwardly into said depression, said stud capable of engaging said objects to limit downward movements thereof, gate means to permit only a single object at a time to exit into said depression, supply means to supply objects to said gate means, gate power means to actuate said gate means, energization terminals, circuit means connecting said switch means and said energization terminals to said gate power means, whereby an object may be picked out of said depression by a downwardly moving tool and the relative approach of said tool and said central stud causing said stud and said object to engage to effect relative approach of said object and said tool.

4. A dispenser for dispensing objects to be received by a downwardly moving tool, comprising, a pick-up stand, a central stud in said stand, apertured plunger means surrounding said stud and movable in said stand relative to said central stud, a depression in the upper end of said stand to receive and center said objects, switch means actuated between open and closed conditions by upward and downward movements of said plunger, said stud engaging said objects to hold same during downward movements of said plunger, gate means to permit only a single object at a time to exit into said depression, supply means to supply objects to said gate means, gate power means to actuate said gate means, energization terminals, circuit means connecting said switch means and said energization terminals to said gate power means, whereby an object may be picked out of said depression by a downwardly moving tool and the relative approach of said tool and said central stud causing said stud and said object to engage to effect relative approach of said object and said tool.

5. A dispenser for dispensing objects comprising, a pick-up stand, a central stud in said stand, an apertured plunger movable in said stand on said central stud, said plunger having an upper portion with a transverse dimension exceeding the maximum dimension across one of said objects and having a depression in the upper end thereof to center said objects, means urging said plunger upwardly to an object receiving point, said stud engaging said objects to hold same during downward movements of said plunger, gate means to permit a selected number of objects at a time to exit into said depression, supply means to supply objects to said gate means, gate power means to actuate said gate means, and means interconnecting said plunger and said gate power means to actuate said gate power means upon one of upward and downward movements of said plunger, whereby objects may be picked out of said depression and the downward force incident thereto depressing said plunger to actuate said gate means.

6. A dispenser for dispensing objects comprising, a pick-up stand, a central stud in said stand, an apertured plunger movable in said stand on said central stud, said plunger having an upper portion with a transverse dimension exceeding the maximum dimension across one of said objects and having a depression in the upper end thereof to center said objects, means urging said plunger upwardly to an object receiving point, switch means actuated between open and closed conditions by upward and downward movements of said plunger, said stud engaging said objects to hold same during downward movements of said plunger, gate means to permit a selected number of objects at a time to exit into said depression, supply means to supply objects to said gate means, gate power means to actuate said gate means, energization terminals, circuit means connecting said switch means and said energization terminals to control energization to said gate power means upon circuit closed condition of said switch means, whereby objects may be picked out of said depression and the downward force incident thereto depressing said plunger to actuate said gate means.

7. A dispenser for dispensing objects comprising, a supply chute having a delivery end, means feeding said objects into said chute, a pick-up stand below said delivery end of said chute, a central stud in said stand, an apertured plunger movable in said stand on said central stud, said plunger having an upper portion with a transverse dimension exceeding the maximum dimension across one of said objects and having a depression in the upper end thereof to center one of said objects, means urging said plunger upwardly to an object receiving point, said stud engaging said objects to hold same during downward movements of said plunger, gate means on said chute to permit only a single object at a time to exit into said depression, gate power means to actuate said gate means, and means interconnecting said plunger and said gate power means to actuate said gate power means upon one of upward and downward movements of said plunger, whereby an object may be picked out of said depression and the downward force incident to picking said object out of said depression depressing said plunger to dispense another object into said depression.

8. A dispenser for dispensing objects comprising, a supply chute having a delivery end, means feeding said objects into said chute, a pick-up stand below said delivery end of said chute, a central stud in said stand, an apertured plunger movable in said stand on said central stud, said plunger having an upper portion with a transverse dimension exceeding the maximum dimension across one of said objects and having a depression in the upper end thereof to center one of said objects, means urging said plunger upwardly to an object receiving point, switch means actuated between open and closed conditions by upward and downward movements of said plunger, said stud engaging said objects to hold same during downward movements of said plunger, gate means on said chute to permit only a single object at a time to exit into said depression, gate power means to actuate said gate means, energization terminals, circuit means connecting said switch means and said energization terminals to control energization to said gate power means upon circuit closed condition of said switch means, whereby an object may be picked out of said depression and the downward force incident to picking said object out of said depression depressing said plunger to dispense another object into said depression.

9. A dispenser for dispensing small apertured objects comprising, a supply chute having a delivery end, means feeding said objects into said chute, a pick-up stand below said delivery end of said chute, a depression in the upper end of said pick-up stand, a central stud in said stand, an apertured plunger movable in said stand on said central stud, said plunger having an upper portion with a transverse dimension exceeding the maximum dimension across one of said objects, said stud having an upper end sufficiently pointed to receive the aperture in said objects and a transverse dimension sufficiently large to not enter said aperture, means urging said plunger upwardly to a point whereat the upper end of said plunger is near the bottom of said depression, gate means on said chute to permit only a single object at a time to exit into said depression, gate power means, and means interconnecting said plunger and said gate power means to actuate said gate means upon one of upward and downward movements of said plunger, whereby an object may be picked out of said depression and the downward force incident to picking said object out of said depression depressing said plunger to dispense another object into said depression of said pick-up stand.

10. A dispenser for dispensing small apertured objects comprising, a supply chute having a delivery end, means feeding said objects into said chute, a pick-up stand below said delivery end of said chute, a depression in the upper end of said pick-up stand, a central stud in said stand, an apertured plunger movable in said stand on said central stud, said plunger having an upper portion with a transverse dimension exceeding the maximum dimension across one of said objects, said stud having an upper end sufficiently pointed to receive the aperture in said objects and a transverse dimension sufficiently large to not enter said aperture, means urging said plunger upwardly to a point whereat the upper end of said plunger is near the bottom of said depression, switch means actuated between open and closed conditions by upward and downward movements of said plunger, gate means on said chute to permit only a single object at a time to exit into said depression, gate power means to actuate said gate means, energization terminals, circuit means connecting said switch means and said energization terminals to control energization to said gate power means upon circuit closed condition of said switch means, whereby an object may be picked out of said depression and the downward force incident to picking said object out of said depression depressing said plunger to dispense another object into said depression of said pick-up stand.

11. A dispenser for dispensing small apertured objects comprising, an inclined chute having first and second ends, means feeding said objects into said first end, a pick-up stand vertically below said second end of said chute, a depression in the upper end of said pick-up stand, a central stud in said stand, an apertured plunger movable in said stand on said central stud, said plunger having an upper portion with a transverse dimension exceeding the maximum dimension across one of said objects, said stud having a pointed upper end to receive the aperture in said objects and a transverse dimension below the pointed end sufficient to not enter said aperture, spring means urging said plunger upwardly to a point whereat the upper end of said plunger is substantially flush with the bottom of said depression, switch means actuated between open and closed conditions by upward and downward movements of said plunger, a gate solenoid, energization terminals, circuit means connecting said solenoid and said switch means to said energization terminals for energization of said solenoid upon circuit closed condition of said switch means, gate means on said chute controlled by said gate solenoid to permit only a single object at a time to exit into said depression, whereby an object may be picked out of said depression and the downward force incident to picking said object out of said depression depressing said plunger to actuate said switch means to dispense another object into said depression of said pick-up stand.

12. A nut dispenser for dispensing small hexagonal nuts having a female thread comprising, a container to contain a large plurality of nuts, an inclined chute having first and second ends, said first end opening into said container, a pick-up stand vertically below and close to said second end of said chute, a cup-shaped depression in the upper end of said pick-up stand, a vertical plunger movable in said pick-up stand, said plunger having a generally cylindrical upper portion with a diameter only slightly exceeding the maximum dimension across the points of said hexagonal nuts, a central axial aperture in said plunger, an upwardly pointed fixed stud in said central aperture of said plunger, spring means urging said plunger upwardly to a point whereat the upper end of said plunger is substantially flush with the bottom of said depression, a switch actuated between open and closed conditions by upward and downward movements of said plunger, said stud having a diameter sufficiently large to not enter the threaded opening in said nuts yet the pointed end of said stud centering and holding said nuts during downward movement of said plunger, a gate solenoid, energization terminals, circuit means connecting said solenoid and said switch to said energization terminals for energization of said solenoid upon circuit closed condition of said switch, gate means on said chute controlled by said gate solenoid to permit only a single nut at a time to exit down said chute into said depression, whereby a nut may be picked out of said depression by a downward movement of a chuck into said pick-up stand which downward movement depresses said plunger to actuate said switch and dispense another nut into said depression of said pick-up stand.

13. A nut dispenser for dispensing small hexagonal nuts having flat upper and lower surfaces comprising, a container to contain a large plurality of nuts, an inclined chute having first and second ends, said first end opening into said container, a pick-up stand vertically below and close to said second end of said chute, a cup-shaped depression in the upper end of said pick-up stand, a central vertical bore in said stand, a shoulder in said bore, a vertical plunger movable in said vertical bore and having a shoulder, an upper end on said plunger substantially flush with the bottom of said depression with said shoulders in engagement, said plunger being generally cylindrical with a diameter only slightly exceeding the maximum dimension across the points of said hexagonal nuts, a central axial aperture in said plunger, an upwardly pointed central fixed stud in said central aperture of said plunger, spring means urging said plunger upwardly to effect engagement of said shoulders, a switch actuated to closed condition by downward movement of said plunger, said stud having a diameter sufficiently large to not enter the threaded opening in said nuts yet the pointed end of said stud centering and holding said nuts during downward movement of said plunger, a gate solenoid mounted on said chute, energization terminals, circuit means connecting said solenoid and said switch to said energization terminals for energization of said solenoid upon circuit closed condition of said switch, upper and lower gates controlled by said gate solenoid to permit only a single nut at a time to pass said lower gate to exit down said chute to said second end and into said depression upon energization of said solenoid, whereby a nut may be picked out of said depression by a downward generally vertical movement of a tool into said pick-up stand which downward movement depresses said plunger to energize said solenoid and dispense another nut into said depression of said pick-up stand.

14. A nut dispenser for dispensing small sized hexagonal nuts having flat upper and lower surfaces comprising, a base, a cylindrical container to contain a large plurality of nuts, means mounting said container on said base with the axis at a slight angle to the vertical, a lowermost side portion on the side of said cylindrical container, a chute having first and second ends and disposed substantially co-planar with said floor, said first end opening into said container at said lowermost side portion, a pick-up stand mounted on said base vertically below and close to said second end of said chute, a cup-shaped partially spherical depression in the upper end of said pick-up stand, a central vertical bore in said stand, a downwardly facing shoulder in said bore, a vertical plunger movable in said vertical bore and having an upwardly facing shoulder, an upper end on said plunger substantially flush with the bottom of said depression with said shoulders in engagement, said plunger being generally cylindrical with a diameter only slightly exceeding the maximum dimension across the points of said hexagonal nuts, a central axial aperture in said plunger, an upwardly pointed central fixed stud in said central aperture of said plunger, the pointed end of said stud entering the threaded opening in said nuts to center same upon downward movement of said plunger and the remainder of said stud having a diameter sufficiently large to not enter said threaded opening, spring means urging said plunger upwardly to effect engagement of said shoulders, a stop limiting downward movement of said plunger, a switch actuated to closed condition by downward movement of said plunger, a gate solenoid mounted on said chute, energization terminals, circuit means connecting said solenoid and said switch to said energization terminals for energization of said solenoid upon circuit closed condition of said switch, upper and lower gates controlled by said gate solenoid to permit only a single nut at a time to pass said lower gate to exit down said chute to said second end and into said depression upon energization of said solenoid, whereby a nut may be picked out of said depression by a magnetic chuck on a nut driving tool by downward generally vertical movement of said chuck into said pick-up stand which downward movement depresses said plunger as said stud holds said nut to cause it to enter said chuck, with movement of said plunger energizing said solenoid to dispense another nut into said depression of said pick-up stand.

References Cited in the file of this patent

UNITED STATES PATENTS

| | | |
|---|---|---|
| 785,133 | Wagner | Mar. 21, 1905 |
| 1,116,507 | Smith | Nov. 10, 1914 |
| 1,681,244 | Latham | Aug. 21, 1928 |
| 2,015,913 | Von Sydow et al. | Oct. 1, 1935 |
| 2,158,168 | Woodruff | May 16, 1939 |
| 2,265,574 | Peterson | Dec. 9, 1941 |
| 2,427,712 | Casler et al. | Sept. 23, 1947 |
| 2,604,577 | Strickland | July 22, 1952 |
| 2,798,935 | Kipp | July 9, 1957 |